United States Patent
Kiyokami

(10) Patent No.: US 11,787,669 B2
(45) Date of Patent: Oct. 17, 2023

(54) WORK SYSTEM

(71) Applicant: TOYOTA JIDOSHA KABUSHIKI KAISHA, Aichi-ken (JP)

(72) Inventor: Hiroaki Kiyokami, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 441 days.

(21) Appl. No.: 17/143,165

(22) Filed: Jan. 7, 2021

(65) Prior Publication Data

US 2021/0229964 A1    Jul. 29, 2021

(30) Foreign Application Priority Data

Jan. 27, 2020  (JP) ................. 2020-010521

(51) Int. Cl.
| | |
|---|---|
| *B66C 13/48* | (2006.01) |
| *B25J 9/16* | (2006.01) |
| *B60K 35/00* | (2006.01) |
| *B60Q 9/00* | (2006.01) |
| *G05D 1/02* | (2020.01) |
| *B66C 23/42* | (2006.01) |

(52) U.S. Cl.
CPC ............ *B66C 13/48* (2013.01); *B25J 9/1676* (2013.01); *B60K 35/00* (2013.01); *B60Q 9/00* (2013.01); *G05D 1/0214* (2013.01); *B60K 2370/152* (2019.05); *B60K 2370/178* (2019.05); *B66C 23/42* (2013.01)

(58) Field of Classification Search
CPC ........ B66C 13/48; B66C 23/42; B25J 9/1676; B60K 35/00; B60K 2370/152; B60K 2370/178; B60Q 9/00; G05D 1/0214; E02F 9/261; B60P 1/5457; B60W 30/08
See application file for complete search history.

(56) References Cited

U.S. PATENT DOCUMENTS

| | | | |
|---|---|---|---|
| 6,363,632 B1 * | 4/2002 | Stentz | E02F 9/24 701/50 |
| 6,405,132 B1 * | 6/2002 | Breed | B60N 2/2863 701/45 |
| 2015/0142276 A1 | 5/2015 | Wu et al. | |
| 2017/0191243 A1 | 7/2017 | Sharp et al. | |
| 2019/0194913 A1 | 6/2019 | Petrany et al. | |

FOREIGN PATENT DOCUMENTS

| | | |
|---|---|---|
| CN | 104085313 A | 10/2014 |
| EP | 3537403 A1 | 9/2019 |
| JP | 18300277 A | 11/1996 |

(Continued)

*Primary Examiner* — Richard M Camby
(74) *Attorney, Agent, or Firm* — HAUPTMAN HAM, LLP

(57) ABSTRACT

A processor is configured to set a monitoring region including at least a part of a movable region of a work device outside a vehicle, and a detection device is configured to detect information on the vicinity of the vehicle. Here, the processor is configured to, when it is determined that an obstacle has entered the monitoring region or it is predicted that an obstacle will enter the monitoring region based on a detection result of the detection device and when a work mode is not an emergency mode, control the work device such that the work device switches the work mode to the emergency mode.

8 Claims, 12 Drawing Sheets

(56) References Cited

FOREIGN PATENT DOCUMENTS

| | | | |
|---|---|---|---|
| JP | H11226889 | A | 8/1999 |
| JP | 2001273032 | A | 10/2001 |
| JP | 201668233 | A | 5/2016 |
| JP | 201886724 | A | 6/2018 |
| JP | 2018128847 | A | 8/2018 |
| WO | 2016010614 | A1 | 1/2016 |

\* cited by examiner

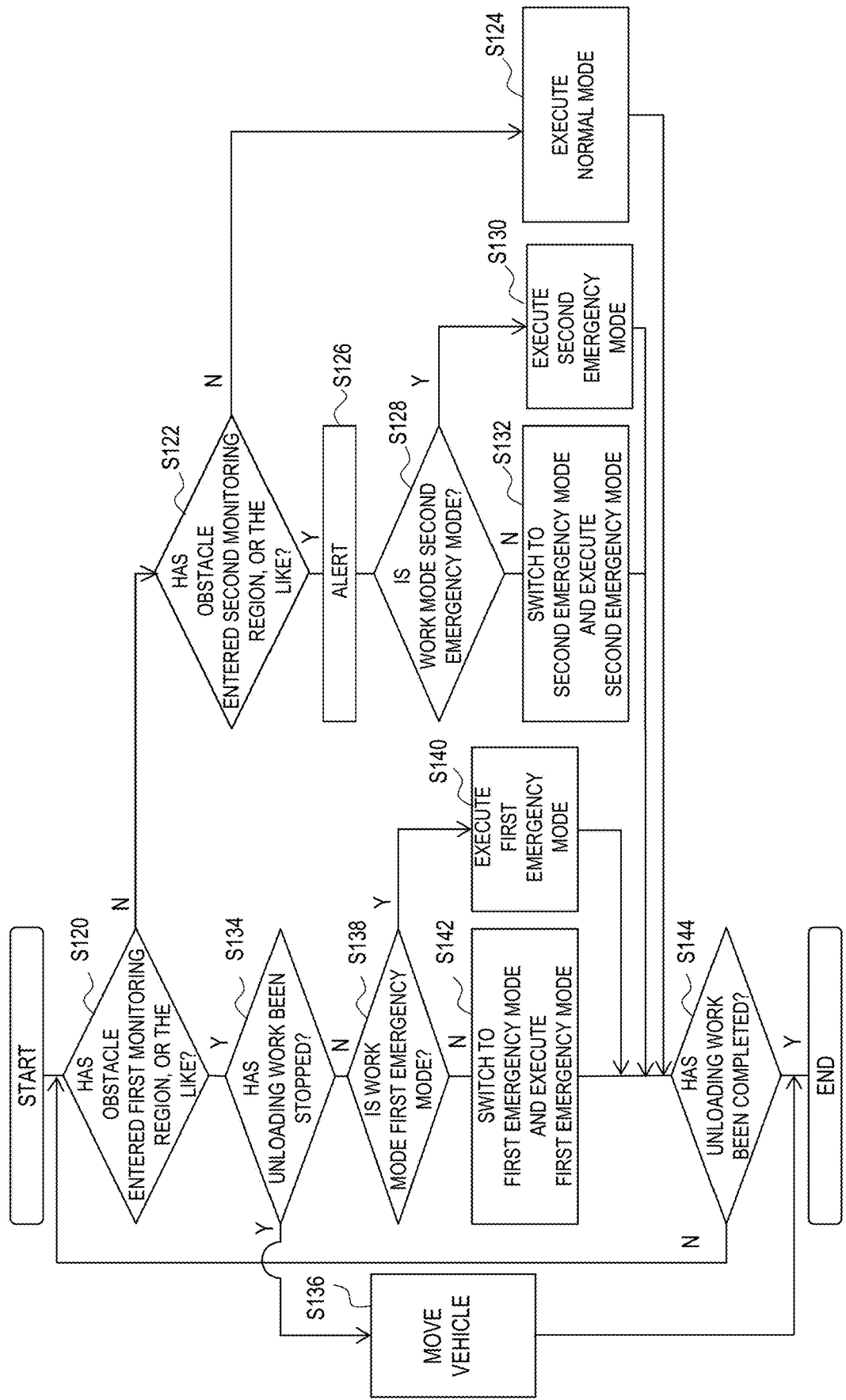

WORK SYSTEM

CROSS-REFERENCE TO RELATED APPLICATION

This application claims priority to Japanese Patent Application No. 2020-010521 filed on Jan. 27, 2020, incorporated herein by reference in its entirety.

BACKGROUND

1. Technical Field

The present disclosure relates to a work system.

2. Description of Related Art

Work devices, such as manipulators, are well-known (see, for example, Japanese Unexamined Patent Application Publication No. 2018-128847 (JP 2018-128847 A) and Japanese Unexamined Patent Application Publication No. 8-300277). For example, JP 2018-128847 A discloses a technology related to a vehicle having a manipulator mounted on a body thereof. In the technology, it is possible to move the vehicle to a work spot and then cause the manipulator to execute various works.

SUMMARY

However, in the above technology, there is room for improvement in preventing or effectively restricting an obstacle from disrupting the work of the manipulator (a work device) when the obstacle approaches the vicinity of the vehicle.

The present disclosure provides a work system that can prevent or effectively restrict an obstacle from disrupting work of a manipulator (a work device) when the obstacle approaches the vicinity of a vehicle.

A work system according to an aspect of the present disclosure includes a work device mounted on a vehicle, and configured to execute work in the vicinity of the vehicle and operate while switching between a plurality of work modes including a normal mode which is a normal work mode and a first emergency mode which is set such that the work device executes the work more safely than in the normal mode during a predefined emergency, a detection device configured to detect information on the vicinity of the vehicle, and a processor configured to set a first monitoring region including at least a part of a movable region of the work device outside the vehicle. The processor is configured to, when it is determined that an obstacle has entered the first monitoring region or it is predicted that an obstacle will enter the first monitoring region based on a detection result of the detection device and when the work mode is not the first emergency mode, control the work device such that the work device switches the work mode to the first emergency mode.

With the above configuration, the work device can be mounted on the vehicle and execute the work in the vicinity of the vehicle. The plurality of work modes is set in the work device, and the plurality of work modes includes the normal mode which is the normal work mode and the first emergency mode which is set such that the work device executes the work more safely than in the normal mode during a predefined emergency. The work device can switch between the plurality of work modes. Further, the processor sets the first monitoring region including at least the part of the movable region of the work device outside the vehicle, and the detection device detects information on the vicinity of the vehicle. Here, when it is determined that an obstacle has entered the first monitoring region or it is predicted that an obstacle will enter first the monitoring region based on the detection result of the detection device and when the work mode is not the first emergency mode, the processor controls the work device such that the work device switches the work mode to the first emergency mode. Therefore, an obstacle is prevented or effectively restricted from disrupting the work of the work device when the obstacle approaches the vicinity of the vehicle.

In the above aspect, the first emergency mode may include stopping of the work by the work device.

With the above configuration, since the emergency mode includes the stopping of the work by the work device, it is possible to prevent, by stopping the work by the work device, the work device from approaching and colliding with an obstacle due to an operation of the work device.

In the above aspect, the plurality of work modes may include a second emergency mode which is set such that the work device executes the work more safely than in the normal mode during the predefined emergency, and the work device executes the work with a work limit smaller than the work limit in the first emergency mode. The processor may set a second monitoring region which includes the entire first monitoring region and is wider than the first monitoring region. The processor may control, when it is determined that an obstacle has not entered the first monitoring region and it is not predicted that an obstacle will enter the first monitoring region, and it is determined that an obstacle has entered the second monitoring region or it is predicted that an obstacle will enter the second monitoring region based on the detection result of the detection device and when the work mode is not the second emergency mode, the work device such that the work device switches the work mode to the second emergency mode.

With the above configuration, the second emergency mode, included in the plurality of work modes, is set such that the work device executes the work more safely than in the normal mode during a predefined emergency. In the second emergency mode, the work device executes the work with the work limit smaller than the work limit in the first emergency mode. Further, the processor sets the second monitoring region which includes the entire first monitoring region and is wider than the first monitoring region. Here, when it is determined that an obstacle has not entered the first monitoring region and it is not predicted that an obstacle will enter the first monitoring region, and it is determined that an obstacle has entered the second monitoring region or it is predicted that an obstacle will enter the second monitoring region based on the detection result of the detection device and when the work mode is not the second emergency mode, the processor controls the work device such that the work device switches the work mode to the second emergency mode. By controlling the work device in such multi-step work modes, an obstacle is prevented or effectively restricted from disrupting the work of the work device while a decrease in work efficiency is curbed.

In the above aspect, the second emergency mode may include the execution of the work by the work device at a work speed lower than the work speed in the normal mode.

With the above configuration, since the second emergency mode includes the execution of the work by the work device at the work speed lower than the work speed in the normal mode, it is possible to prevent or effectively restrict an obstacle from disrupting the work device while the work is executed without stopping.

In the above aspect, the work system may further include an alerting device configured to alert the surroundings of the vehicle. The processor may control, when it is determined that an obstacle has entered the second monitoring region or it is predicted that an obstacle will enter the second monitoring region based on the detection result of the detection device, the alerting device such that the alerting device alerts the surroundings of the vehicle.

With the above configuration, when it is determined that an obstacle has entered the second monitoring region or it is predicted that an obstacle will enter the second monitoring region based on the detection result of the detection device, the processor controls the alerting device such that the alerting device alerts the surroundings of the vehicle. Therefore, it is possible to alert the surroundings of the vehicle.

In the above aspect, the work system may further include a display device configured to visibly display at least a range of the first monitoring region in a plan view.

With the above configuration, a pedestrian or the like can easily recognize at least the range of the monitoring region in a plan view.

In the above aspect, the work system may include a display device configured to visibly display at least a range of the second monitoring region in a plan view.

With the above configuration, a pedestrian or the like can easily recognize at least the range of the second monitoring region in a plan view.

In the above aspect, the processor may execute, when it is determined that an obstacle has entered the first monitoring region or it is predicted that an obstacle will enter the first monitoring region based on the detection result of the detection device and when the work device has stopped the work, control for moving the vehicle such that the first monitoring region is positioned in an area which an obstacle has neither entered nor is predicted to enter.

With the above configuration, since the vehicle moves such that the monitoring region is positioned in an area which an obstacle has neither entered nor is predicted to enter, an obstacle is prevented or effectively restricted from disrupting the work of the work device.

In the above aspect, the work device may be configured to be automatically controlled by a predetermined program.

With the above configuration, since the work device does not require an operation instruction from an operator, an obstacle is prevented or effectively restricted from disrupting the work of the work device.

As described above, with the foregoing aspect of the present disclosure, it is possible to prevent or effectively restrict an obstacle from disrupting a work of a work device when the obstacle approaches the vicinity of a vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 14 is a flowchart illustrating an example of a flow of a work control process by the ECU in the work system of FIG. 11.

DETAILED DESCRIPTION OF EMBODIMENTS

First Embodiment

A work system according to a first embodiment of the present disclosure will be described with reference to FIGS. 1 to 7. In these drawings, arrows are appropriately illustrated, and more specifically, an arrow FR represents the front side of a vehicle, an arrow UP represents the upper side thereof, and an arrow RH represents the right side thereof when viewed in the traveling direction of the vehicle.

Figure 1:
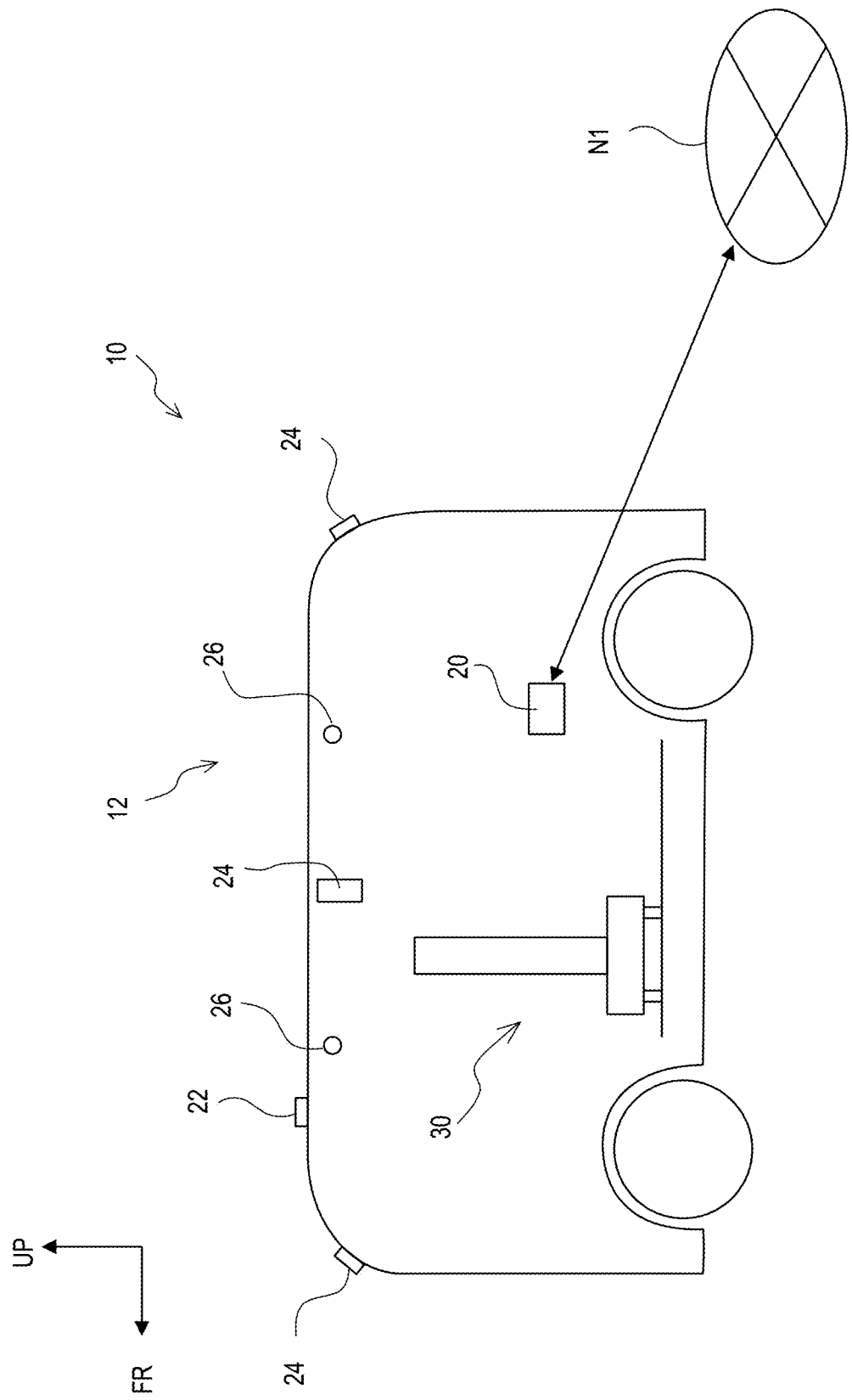
FIG. 1 is a diagram illustrating a schematic configuration of a work system according to a first embodiment.

FIG. 1 is a diagram illustrating a schematic configuration of a work system 10 according to the present embodiment. The vehicle 12 to which the work system 10 is applied is an electric vehicle capable of autonomous driving. A well-known technology can be applied to a technology for the autonomous driving to a destination (an unloading work spot in the present embodiment), and thus detailed description thereof will be omitted. The vehicle 12 includes an electronic control unit (ECU) 20 that executes various controls including the autonomous driving. The ECU 20 is connected to various servers or the like (not shown) via a network N1. Further, the vehicle 12 includes an automatic unloading device 30 mounted thereon, as a work device. The automatic unloading device 30 can be recognized as an unloading robot.

A global positioning system (GPS) device 22 (appropriately omitted in the drawings other than FIG. 1) is provided on a predetermined position of the upper portion of the vehicle 12. Moreover, as detection units, vicinity detection sensors 24 (appropriately omitted in the drawings other than FIG. 1) are provided on the upper portion of the front, rear, right, and left side portions of the vehicle 12, respectively. In addition, as a pair of front-rear display units, projectors 26 are provided on the upper portions of the right and left side portions of the vehicle 12, respectively.

Figure 2:
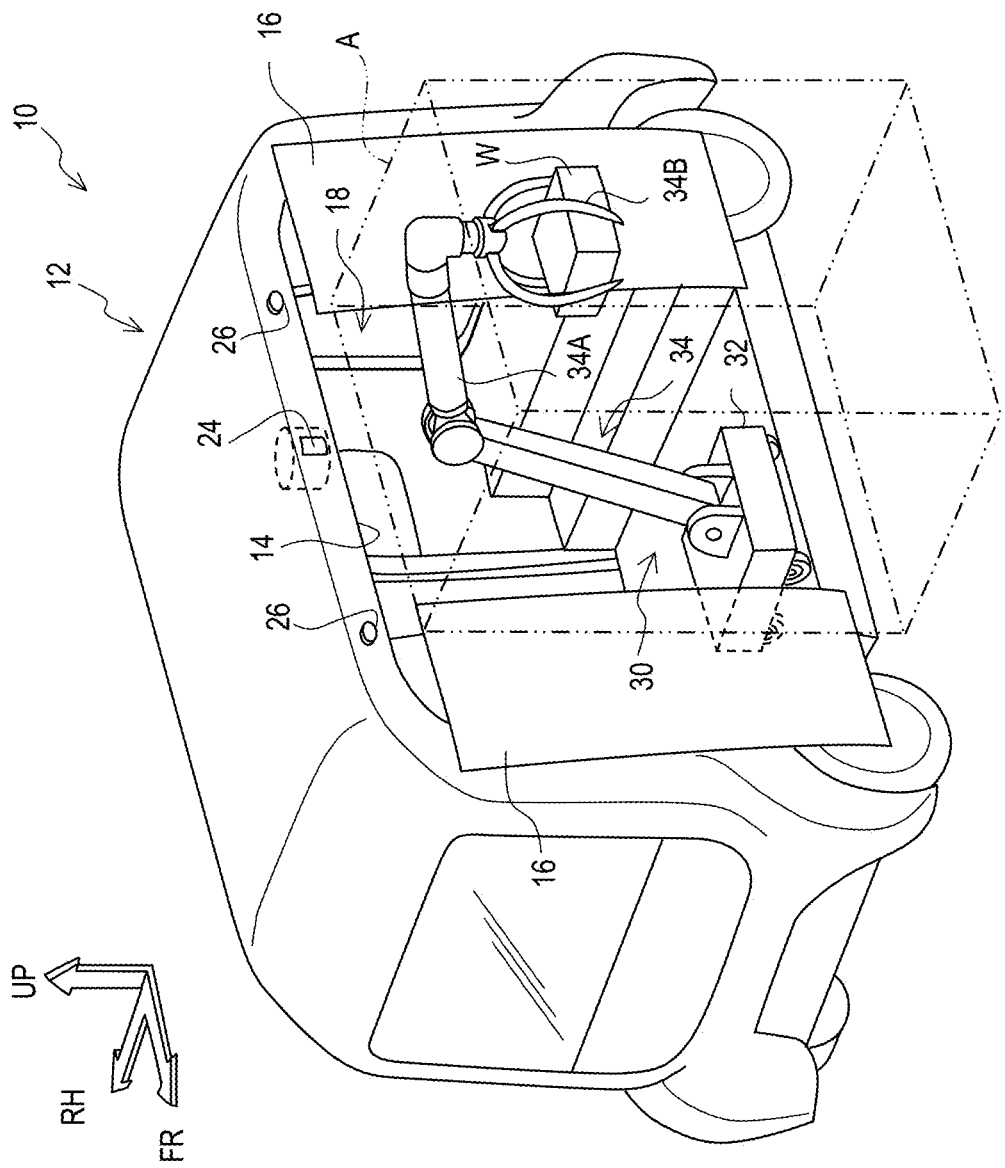
FIG. 2 is a perspective view illustrating a vehicle to which the work system of FIG. 1 is applied.

FIG. 2 is a perspective view illustrating the vehicle 12 to which the work system 10 is applied. As illustrated in FIG. 2, side door openings 14 are formed on the right and left side portions of the vehicle 12. Each side door opening 14 can be opened and closed by a pair of front-rear slide doors 16 capable of sliding in the front-rear direction of the vehicle. Although not shown, a ramp can extend from the lower edge of the side door opening 14 toward the surface of a road.

The vehicle cabin 18 of the vehicle 12 accommodates the automatic unloading device 30. The automatic unloading device 30 is configured to be automatically controlled by a predetermined program, and includes a moving trolley 32 and a robot arm 34 fixed on the moving trolley 32. The moving trolley 32 is a device that moves the automatic unloading device 30 in, for example, the vehicle cabin 18. Further, the robot arm 34 includes an arm portion 34A having a joint portion, and a hand portion 34B connected to the tip of the arm portion 34A. The hand portion 34B can hold a package W. A well-known technology can be applied to a basic configuration of each of the moving trolley 32 and the robot arm 34, and thus detailed description thereof will be omitted.

In the automatic unloading device 30, a plurality of work modes (two modes in the present disclosure) is set, and the work modes include a normal mode which is a normal work mode, and an emergency mode which is set such that the work device executes an unloading work more safely than in the normal mode during a predefined emergency. In other words, the automatic unloading device 30 is configured to be capable of switching between the work modes. The emergency mode includes stopping of the unloading work by the automatic unloading device 30.

Figure 3:
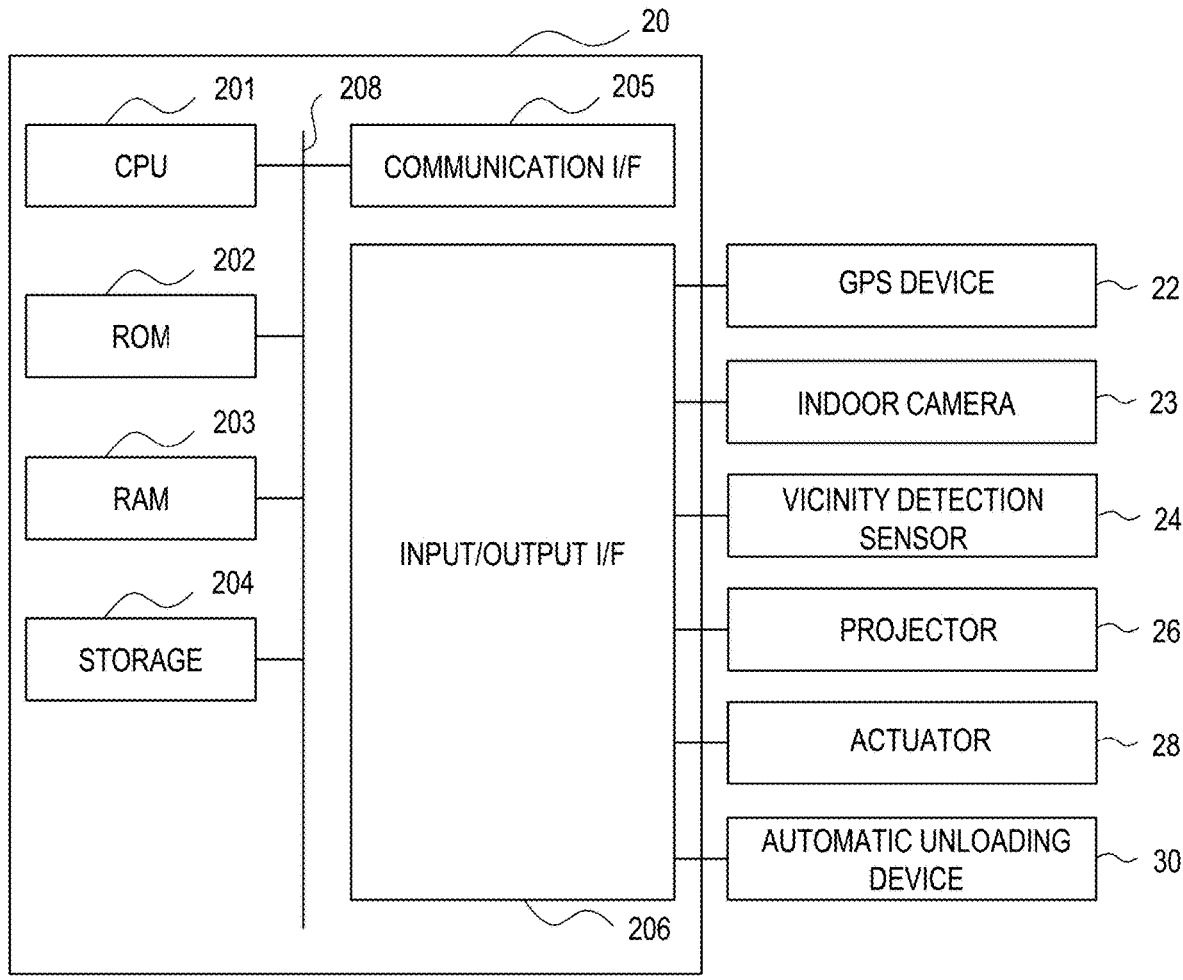
FIG. 3 is a block diagram illustrating an example of a hardware configuration of the work system of FIG. 1.

FIG. 3 is a block diagram illustrating an example of a hardware configuration of the work system 10 according to the present embodiment. The ECU 20 of the work system 10 is connected to the GPS device 22, an indoor camera 23, the vicinity detection sensors 24, the projectors 26, an actuator 28, and the automatic unloading device 30. The GPS device 22 acquires a current position of the vehicle 12. The indoor camera 23 captures an image of the inside of the vehicle cabin 18. The vicinity detection sensors 24 detect information on the vicinity of the vehicle 12. For example, light detection and ranging/laser imaging, detection, and ranging (LIDAR) that scans a predetermined range, a camera (a monocular camera or a compound eye camera) that captures an image of a predetermined range, and a millimeter-wave radar that transmits an exploration wave in a predetermined range can be applied to the vicinity detection sensors 24. The projectors 26 visibly display a range of a monitoring region A (see FIG. 2) in a plan view by projecting a line on the surface of the ground (see a projection line 26L in FIG. 6). The actuator 28 executes acceleration/deceleration and steering of the vehicle 12. The automatic unloading device 30 can be recognized as an unloading robot, and is configured to be capable of executing the unloading work in the vicinity of the vehicle 12 when the vehicle 12 arrives at the unloading work spot.

The ECU 20 includes a central processing unit (CPU: a processor) 201, a read-only memory (ROM) 202, a random access memory (RAM) 203, a storage 204, a communication interface (I/F) 205, and an input/output I/F 206. The CPU 201, the ROM 202, the RAM 203, the storage 204, the communication I/F 205, and the input/output I/F 206 are connected to one another via buses 208 so as to communicate with one another.

The CPU 201 is a central processing unit, and executes various programs and controls each unit. In other words, the CPU 201 reads out a program from the ROM 202 or the storage 204, and executes the program using the RAM 203 as a work region. The CPU 201 controls each of components and executes various arithmetic processes according to a program recorded in the ROM 202 or the storage 204. In the present embodiment, the ROM 202 or the storage 204 stores a region setting program for setting the monitoring region A (see FIG. 2), a work program for suitably executing the unloading work, and the like.

The ROM 202 stores various programs and various pieces of data. The RAM 203 temporarily stores a program or data as a work region. The storage 204 is composed of a storage device, such as a hard disk drive (HDD) or a solid-state drive (SSD), and stores various programs and various pieces of data. The communication I/F 205 is an interface that enables the ECU 20 to communicate with other equipment and uses standards, such as Ethernet®, FDDI, and Wi-Fi®.

The input/output I/F 206 is an interface used for communicating each device mounted on the vehicle 12. For example, the GPS device 22, the indoor camera 23, the vicinity detection sensors 24, the projectors 26, the actuator 28, and the automatic unloading device 30 are connected to the ECU 20 of the present embodiment via the input/output I/F 206. The GPS device 22, the indoor camera 23, the vicinity detection sensors 24, the projectors 26, the actuator 28, and the automatic unloading device 30 may be directly connected to the buses 208.

Figure 4:
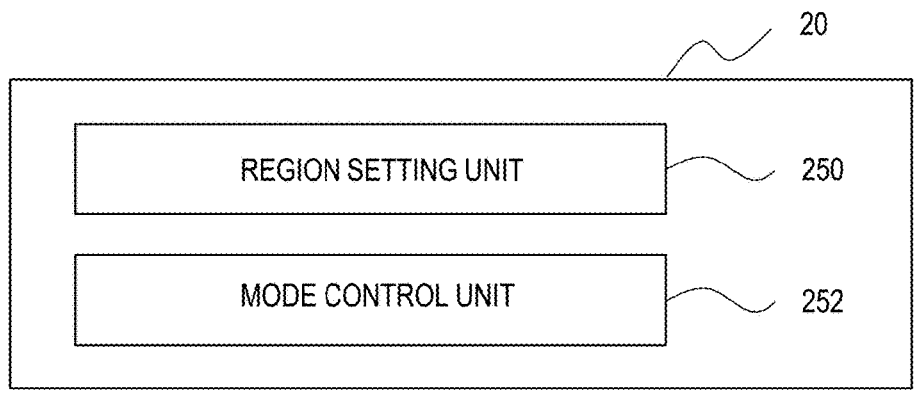
FIG. 4 is a block diagram illustrating an example of a functional configuration of an electronic control unit (ECU) of FIG. 1.

FIG. 4 is a block diagram illustrating an example of a functional configuration of the ECU 20. As illustrated in FIG. 4, the ECU 20 includes a region setting unit 250 and a mode control unit 252 as functional components. The CPU 201 reads out and executes the programs (the above-described region setting program and work program) stored in the ROM 202 or the storage 204, whereby a function of each component is realized.

The region setting unit 250 sets the monitoring region A (see FIG. 2) including at least a part of a movable region of the automatic unloading device 30 outside the vehicle 12 (the entire movable region of the automatic unloading device 30 outside the vehicle 12 in the present embodiment).

When it is determined that an obstacle has entered the monitoring region A or it is predicted that an obstacle will enter the monitoring region A based on the detection result of each of the vicinity detection sensors 24 and when the work mode is not the emergency mode, the mode control unit 252 controls the automatic unloading device 30 such that the automatic unloading device 30 switches the work mode to the emergency mode.

Whether an obstacle will enter the monitoring region A can be predicted in the following manner. For example, the mode control unit 252 identifies a moving object in the vicinity of the vehicle 12 based on the detection result of each of the vicinity detection sensors 24. Then, the mode control unit 252 predicts a future position of the identified moving object based on its past movement path. When the predicted position of the moving object is within the monitoring region A, the mode control unit 252 predicts that the obstacle will enter the monitoring region A. On the other hand, when the predicted position of the moving object is not within the monitoring region A, the mode control unit 252 predicts that the obstacle will not enter the monitoring region A.

Next, an action of the work system 10 will be described.

Figure 5:
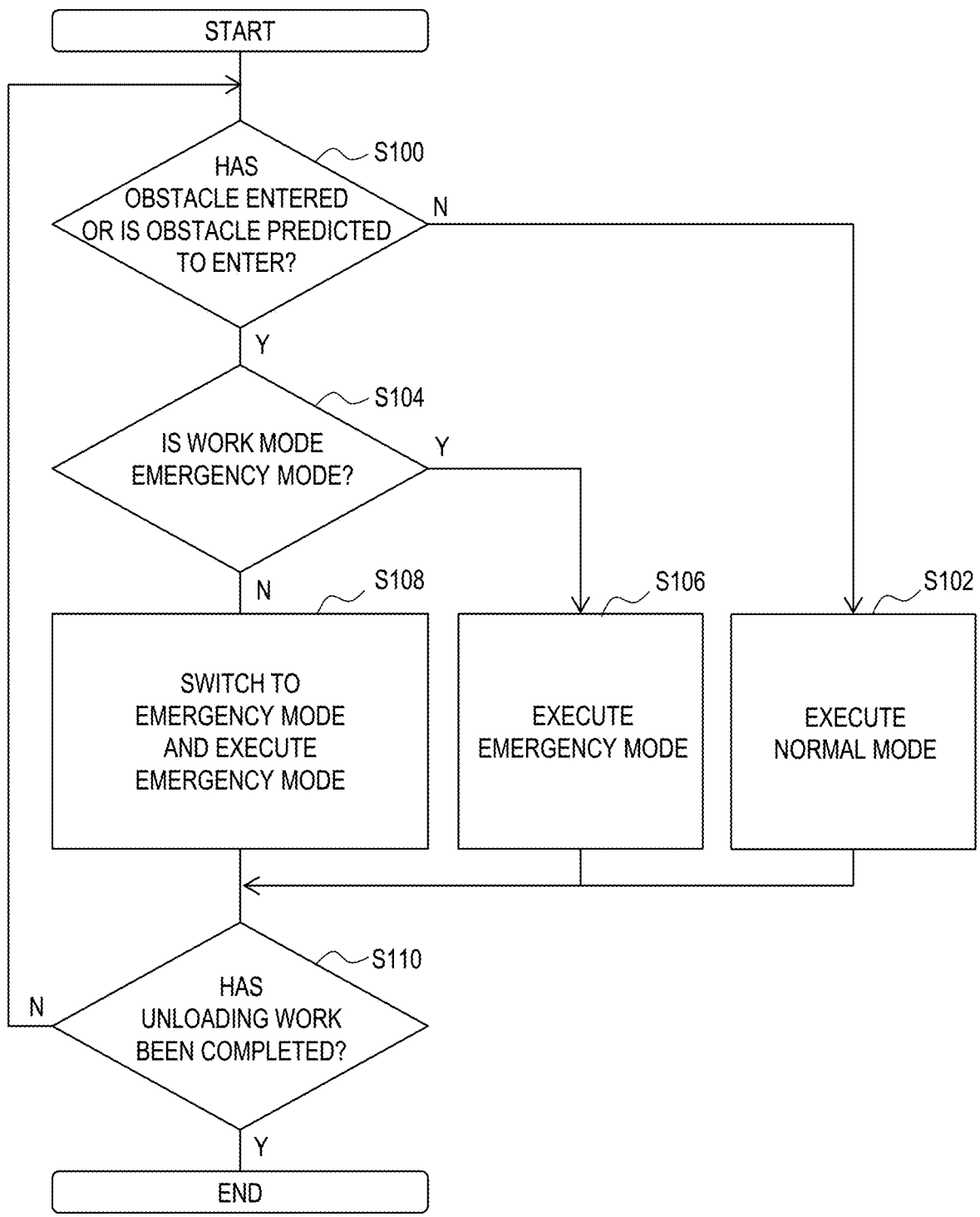
FIG. 5 is a flowchart illustrating an example of a flow of a work control process by the ECU of FIG. 1.

FIG. 5 is a flowchart illustrating an example of a flow of a work control process by the ECU 20. The CPU 201 reads out the work program from the ROM 202 or the storage 204, and develops and executes it in the RAM 203, whereby the work control process is executed by the ECU 20. When the vehicle 12 has stopped at a planned unloading work spot and the region setting unit 250 has set the monitoring region A (see FIG. 2) including at least the part of the movable region of the automatic unloading device 30 outside the vehicle 12, the execution of the control process illustrated in FIG. 5 is started.

The CPU 201 determines, based on the detection result of each of the vicinity detection sensors 24, whether an obstacle has entered the monitoring region A or is predicted to enter the monitoring region A (step S100).

Upon determining that an obstacle has neither entered the monitoring region A nor is predicted to enter the monitoring region A (step S100: N), the CPU 201 controls the automatic unloading device 30 such that the automatic unloading device 30 executes the normal mode (step S102), and the CPU 201 proceeds to a process of step S110 to be described below. Upon determining that an obstacle has entered the monitoring region A or is predicted to enter the monitoring region A (step S100: Y), the CPU 201 proceeds to a process of step S104.

In step S104, the CPU 201 determines whether the work mode is the emergency mode. When the work mode is the emergency mode (step S104: Y), the CPU 201 controls the automatic unloading device 30 such that the automatic unloading device 30 executes the emergency mode (step S106), and the CPU 201 proceeds to the process of step S110 to be described below. On the other hand, when the work mode is not the emergency mode (step S104: N), the CPU 201 controls, as the mode control unit 252, the automatic unloading device 30 such that the automatic unloading device 30 switches the work mode to the emergency mode and executes the emergency mode (step S108), and the CPU 201 proceeds to the process of step S110 to be described below.

By the execution of the emergency mode, an obstacle is prevented or effectively restricted from disrupting the work of the automatic unloading device 30 when the obstacle approaches the vicinity of the vehicle 12. Here, the emergency mode includes the stopping of the unloading work by the automatic unloading device 30. Therefore, by stopping the unloading work by the automatic unloading device 30, it is possible to prevent the automatic unloading device 30 from approaching and colliding with an obstacle due to the operation of the automatic unloading device 30.

Further, in the next step S110, the CPU 201 determines whether the automatic unloading device 30 has completed the unloading work. Upon determining that the automatic unloading device 30 has not completed the unloading work (step S110: N), the CPU 201 repeats the processes from step S100. On the other hand, upon determining that the automatic unloading device 30 has completed the unloading work (step S110: Y), the CPU 201 ends the process based on the unloading work program.

Figure 7:
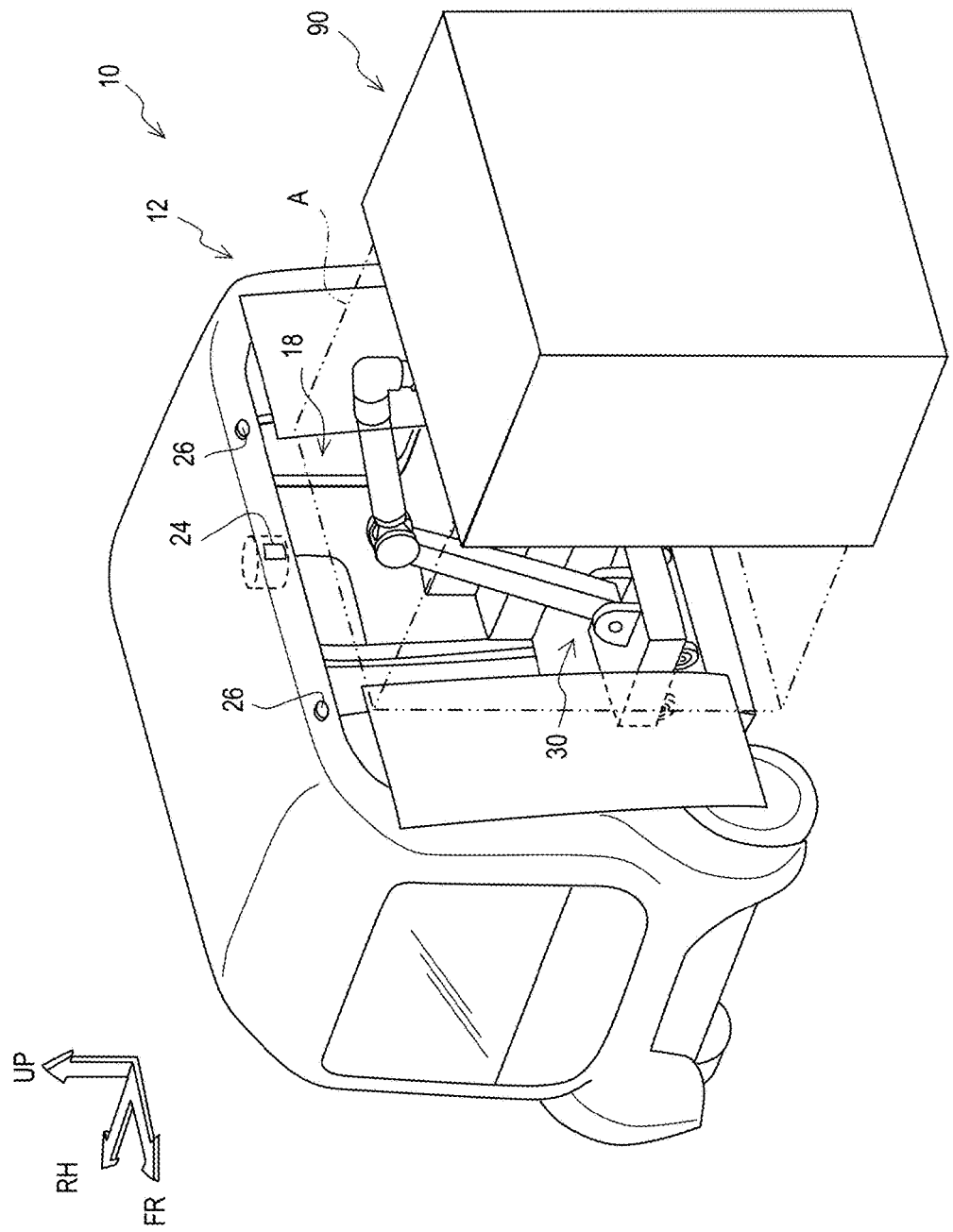
FIG. 7 is a perspective view illustrating an example of a positional relationship between the monitoring region outside the vehicle and a delivery locker in and out of which goods are taken.

Here, an example of setting the above-described monitoring region A (see FIG. 2) will be supplementarily described. FIG. 7 is a perspective view illustrating an example of a positional relationship between the monitoring region A outside the vehicle 12 and a delivery locker 90 in and out of which goods are taken. When the vehicle 12 has stopped at the planned unloading work spot, the CPU 201 determines a range in which the automatic unloading device 30 can operate based on, for example, a position and a size of a package to be unloaded, and a relative position between a stopped position of the vehicle 12 and a target position of the package (for example, a position at which the package is to be stored in the delivery locker 90). Thereafter, the CPU 201 sets the monitoring region A so as to include space through which the automatic unloading device 30 passes outside the vehicle 12, based on a predetermined calculation formula. In other words, the CPU 201 reads out the region setting program from the ROM 202 or the storage 204, and develops and executes it in the RAM 203, whereby the setting process of the monitoring region A is executed.

Figure 6:
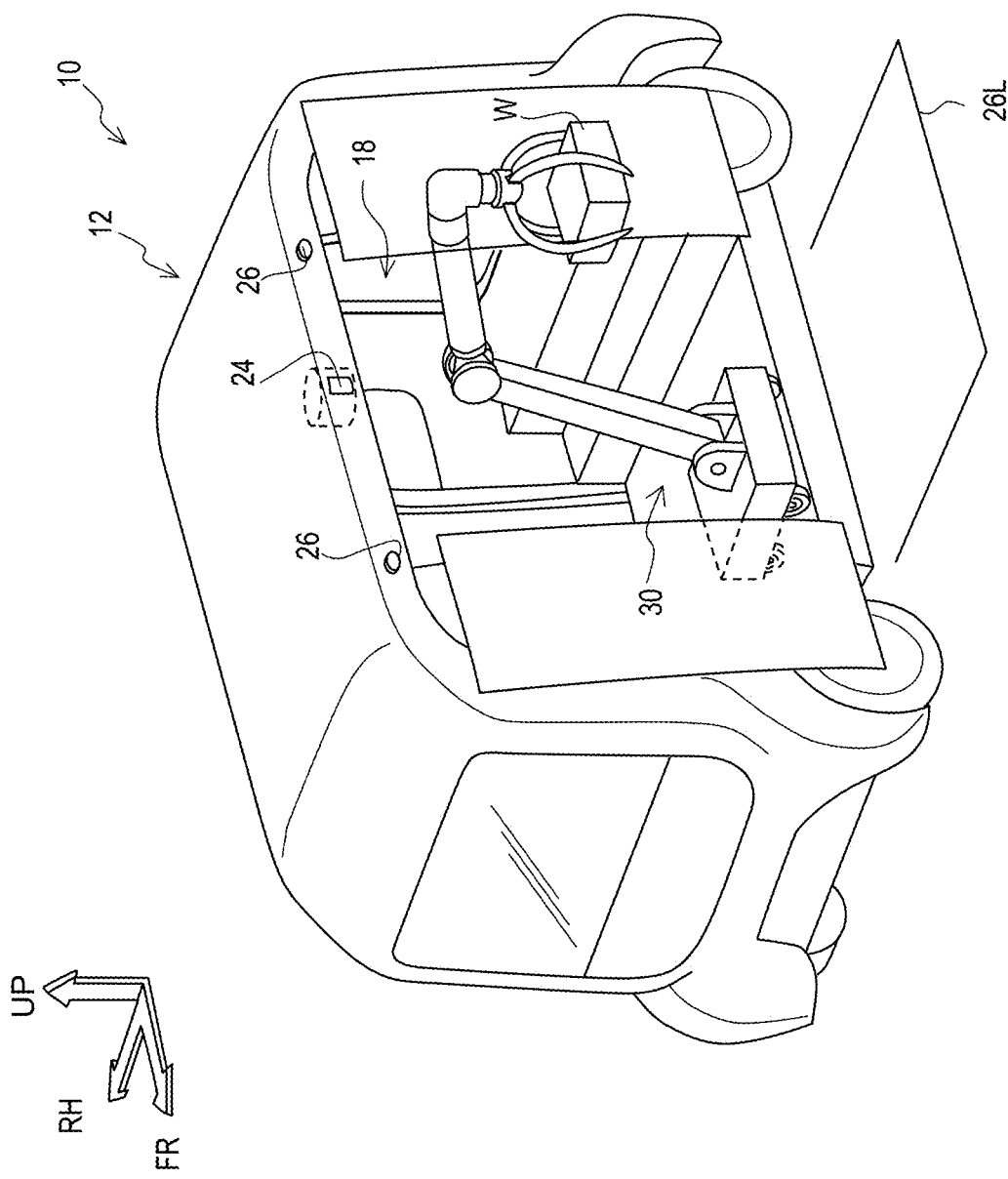
FIG. 6 is a perspective view illustrating a state where a range of a monitoring region is visibly displayed in a plan view, using a projector provided in the vehicle.

Further, in the present embodiment, the range of the monitoring region A in a plan view illustrated in FIG. 2 is visibly displayed by the projection line 26L projected onto the road surface by the projectors 26 illustrated in FIG. 6. Therefore, a pedestrian or the like can easily recognize the range of the monitoring region A (see FIG. 2) in a plan view. Accordingly, by avoiding, in advance, a state where an obstacle has entered the monitoring region A (see FIG. 2) or a state where an obstacle is likely to enter the monitoring region A, it is possible to prevent a decrease in efficiency of the unloading work while ensuring safety.

Moreover, in the present embodiment, since the automatic unloading device 30 is configured to be automatically controlled by a predetermined program, the automatic unloading device 30 does not require an operation instruction from an operator and an obstacle is prevented or effectively restricted from disrupting the work of the automatic unloading device 30.

As described above, according to the present embodiment, it is possible to prevent or effectively restrict an obstacle from disrupting the work of the automatic unloading device 30 when the obstacle approaches the vicinity of the vehicle 12.

Modified Example of First Embodiment

Figure 8:
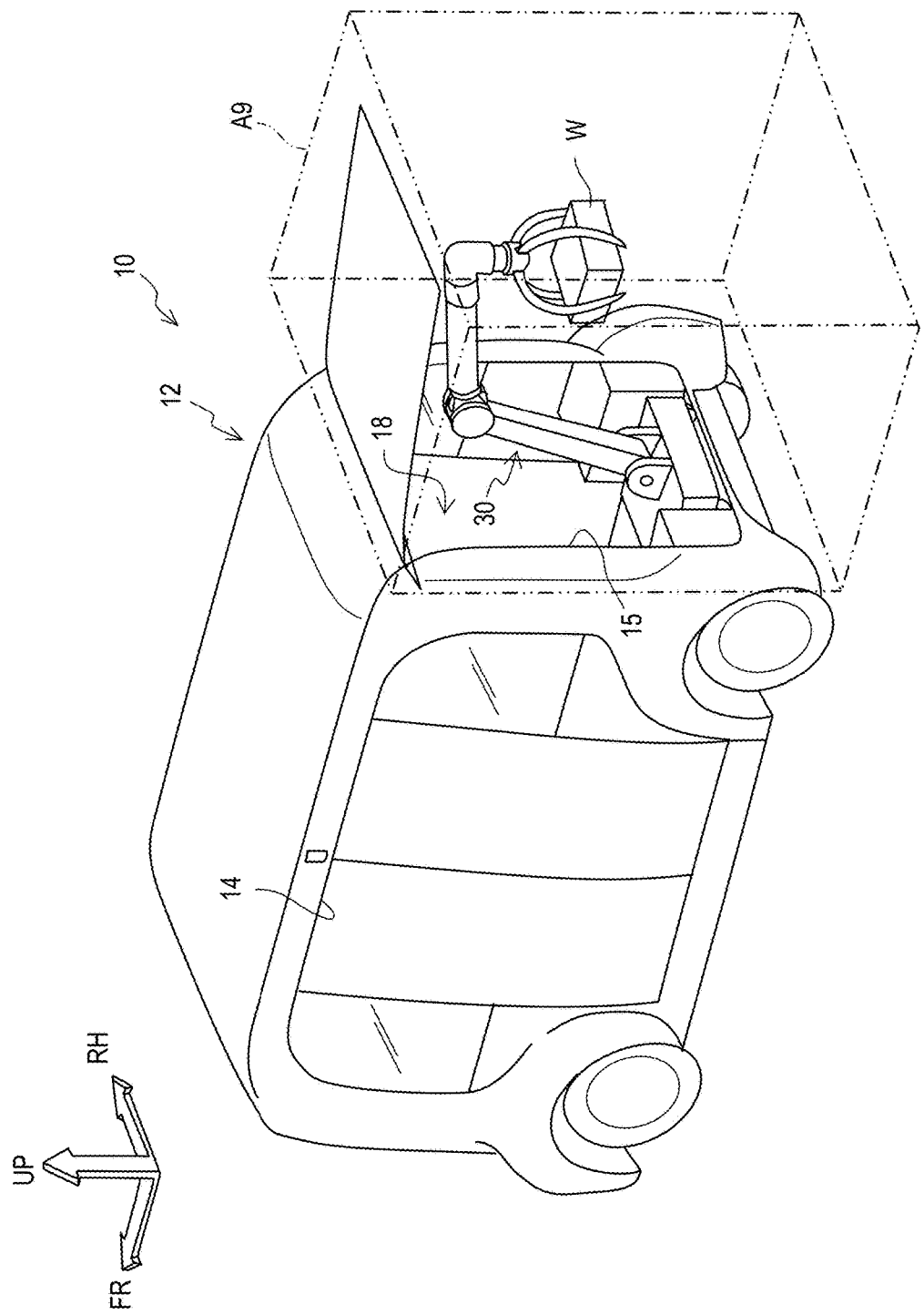
FIG. 8 is a perspective view illustrating a modified example of the first embodiment.

In the first embodiment, a case is described in which the monitoring region A is set to, for example, a side of the vehicle 12 in a configuration where the package W is taken in and out through the side door opening 14 of the vehicle 12 illustrated in FIG. 2 and the like. However, as illustrated in FIG. 8, a monitoring region A9 may be set to, for example, the rear side of the vehicle 12 in a configuration where the package W is taken in and out through a rear door opening 15 of the vehicle 12. In such a case, although not shown in FIG. 8, for example, a detection unit that detects the information on the vicinity of the vehicle can be additionally provided at the surrounding portion of the rear door opening 15.

Second Embodiment

Next, a second embodiment will be described with reference to FIGS. 9 and 10 while using FIGS. 2 and 3. A work system according to the present embodiment is the same as the work system 10 according to the first embodiment except for features to be described below. Parts the same as those of the first embodiments are denoted by the same reference signs, and thus description thereof will be omitted. Further, a hardware configuration of the work system according to the present embodiment is the same as that of the work system according to the first embodiment (see FIG. 3), and thus illustration and detailed description thereof will be omitted by using FIG. 3.

The ROM 202 or the storage 204 of an ECU 20 of the present embodiment stores a region setting program which is the same as that described in the first embodiment, a work program which is different from that described in the first embodiment, and the like.

Figure 9:
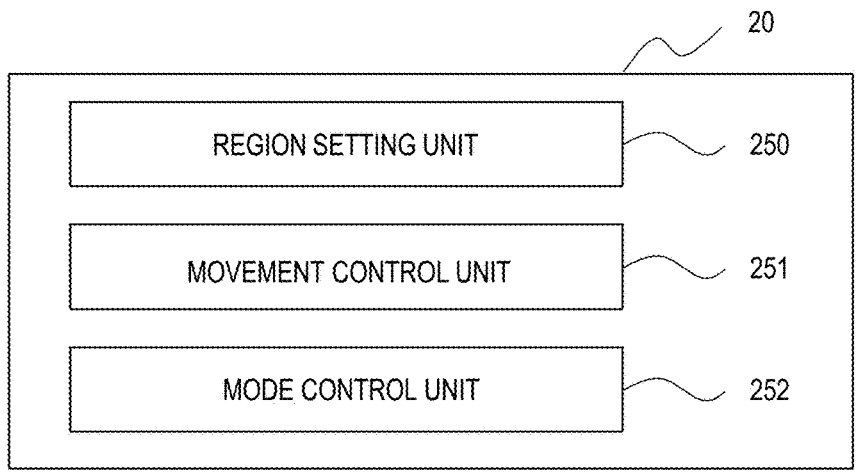
FIG. 9 is a block diagram illustrating an example of a functional configuration of an ECU of a second embodiment.

FIG. 9 is a block diagram illustrating an example of a functional configuration of the ECU 20. As illustrated in FIG. 9, the ECU 20 includes a region setting unit 250, a movement control unit 251, and a mode control unit 252, as functional components. The CPU 201 reads out and executes the programs (the above-described region setting program and work program of the present embodiment) stored in the ROM 202 or the storage 204, whereby a function of each component is realized.

When it is determined that an obstacle has entered the monitoring region A or it is predicted that an obstacle will enter the monitoring region A based on the detection result of each of the vicinity detection sensors 24 and when the automatic unloading device 30 has stopped the unloading work, the movement control unit 251 executes control for moving the vehicle 12 such that the monitoring region A (see FIG. 2) is positioned in an area which an obstacle has neither entered nor is predicted to enter.

Figure 10:
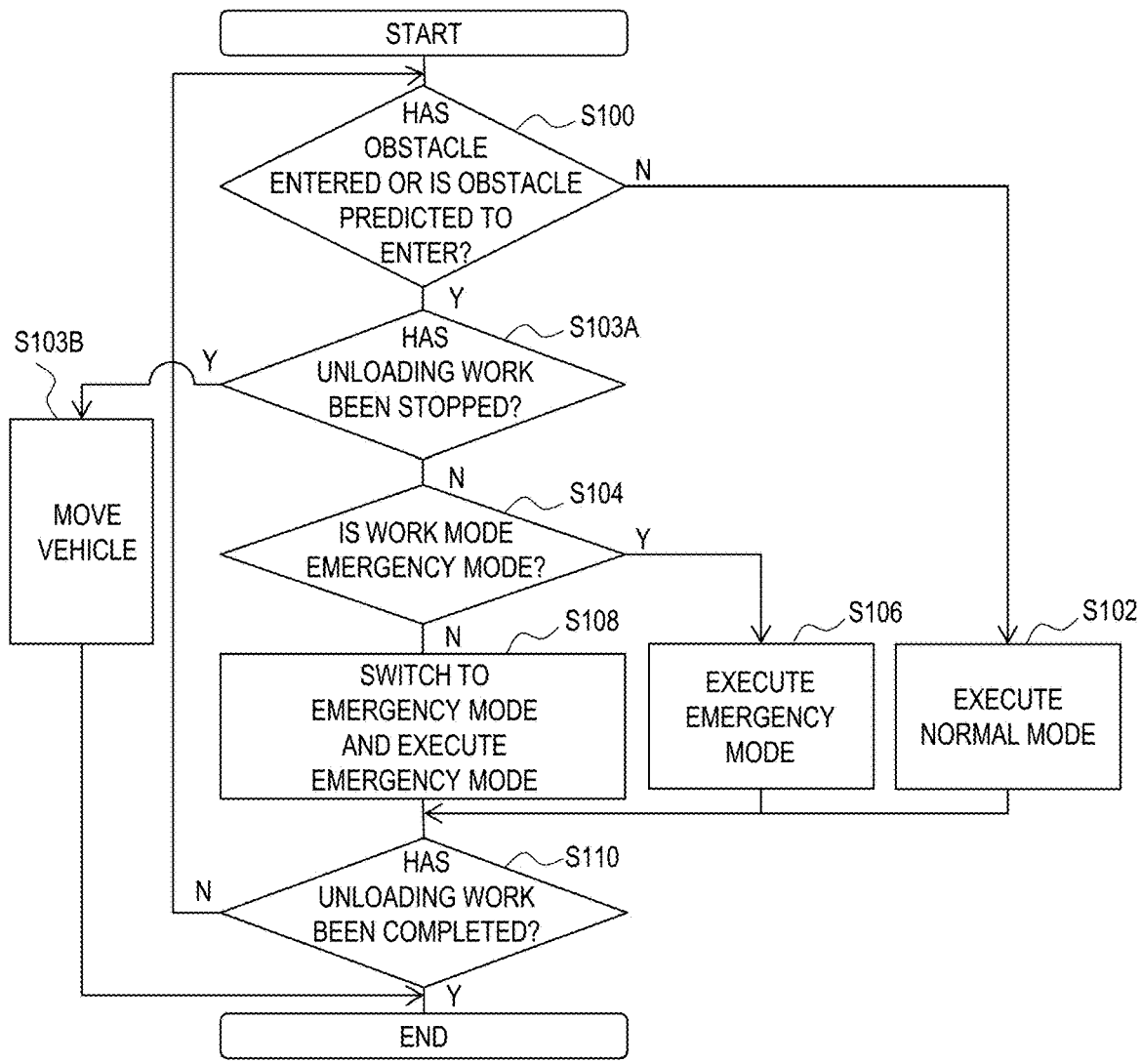
FIG. 10 is a flowchart illustrating an example of a flow of a work control process by the ECU of the second embodiment.

FIG. 10 is a flowchart illustrating an example of a flow of a work control process by the ECU 20. The CPU 201 reads out the work program from the ROM 202 or the storage 204, and develops and executes it in the RAM 203, whereby the work control process is executed by the ECU 20. When the vehicle 12 has stopped at the planned unloading work spot and the region setting unit 250 sets the monitoring region A including at least the part of the movable region of the automatic unloading device 30 outside the vehicle 12, the execution of the control process illustrated in FIG. 10 is started.

The flowchart illustrated in FIG. 10 is different from the flowchart of the first embodiment (see FIG. 5) in that in the former, step S103A is added between step S100 and step S104, and step S103B to be executed when a determination in step S103A is positive is added.

In step S103A, the CPU 201 determines whether the automatic unloading device 30 has stopped the unloading work. When the automatic unloading device 30 is executing the unloading work without stopping (step S103A: N), the CPU 201 proceeds to the process of step S104. On the other hand, when the automatic unloading device 30 has stopped the unloading work (step S103A: Y), the CPU 201 executes, as the movement control unit 251, control for moving the vehicle 12 such that the monitoring region A is positioned in an area which an obstacle has neither entered nor is predicted to enter (step S103B). Therefore, an obstacle is prevented or effectively restricted from disrupting the work of the automatic unloading device 30. After executing step S103B, the CPU 201 ends the process based on the work program.

When the vehicle 12 has moved and stopped at a new planned unloading work spot in the process of step S103B, as an example in the present embodiment, the monitoring region A (see FIG. 2) including at least the part of the movable region of the automatic unloading device 30 outside the vehicle 12 is set again, and the execution of the control process illustrated in FIG. 10 is restarted.

Further, according to the present embodiment, it is possible to prevent or effectively restrict an obstacle from disrupting the work of the automatic unloading device 30 when the obstacle approaches the vicinity of the vehicle 12.

In a modified example of the second embodiment, instead of step S103B and ending the process after the execution of step S103B in FIG. 10, when the CPU 201 has determined in step S103A that the automatic unloading device 30 has stopped the unloading work, the CPU 201 may return to the process of step S100.

Third Embodiment

Next, a work system according to a third embodiment of the present disclosure will be described with reference to FIGS. 11 to 14. Components substantially the same as those of the first embodiment are denoted by the same reference signs, and thus description thereof will be omitted.

Figure 11:
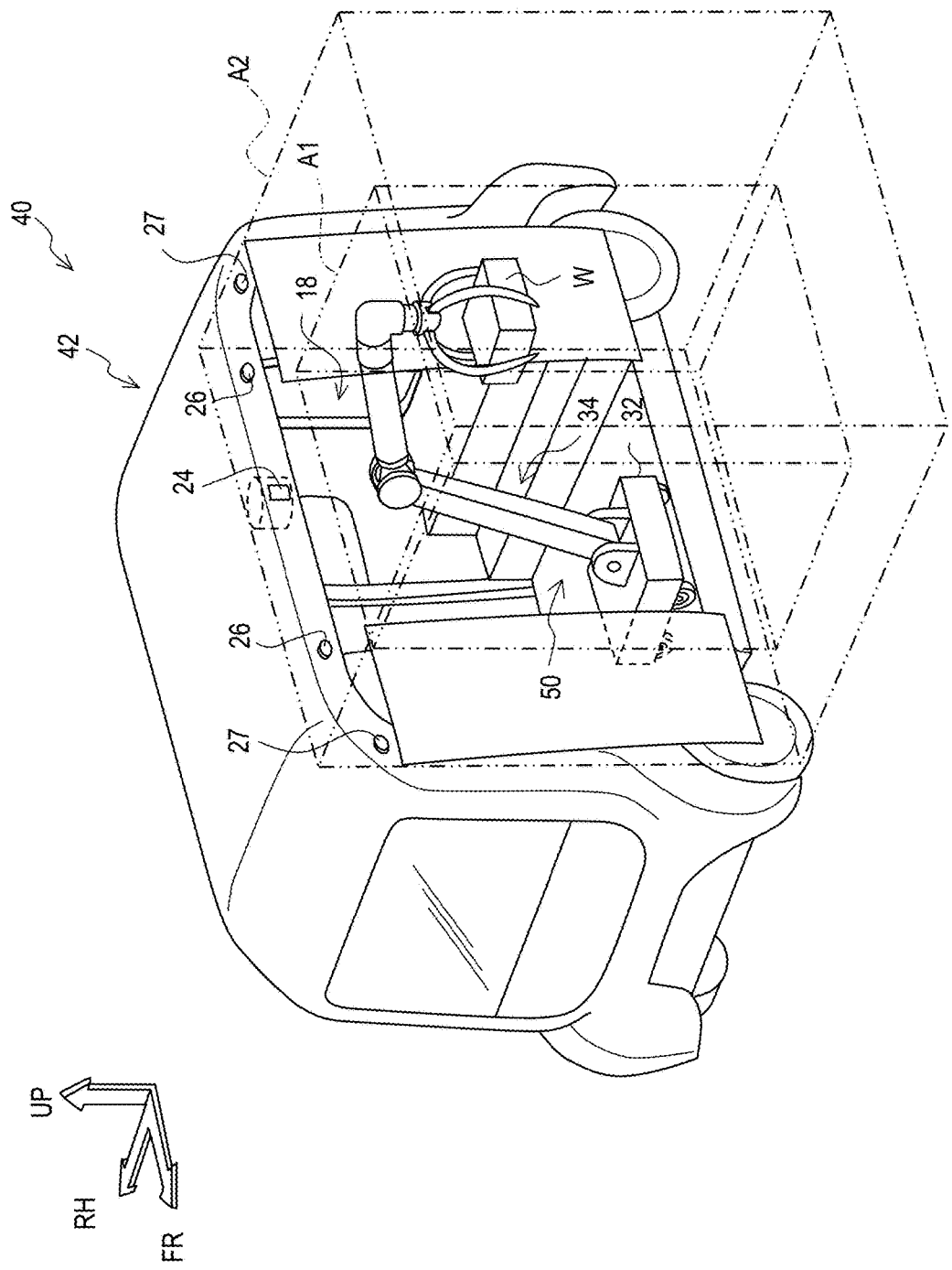
FIG. 11 is a perspective view illustrating a vehicle to which a work system according to a third embodiment is applied.

FIG. 11 is a perspective view illustrating a vehicle 42 to which a work system 40 according to the present embodiment is applied. A configuration of the vehicle 42 illustrated in FIG. 11 is substantially the same as that of the vehicle 12 (see FIG. 2) of the first embodiment except for features to be described below.

As illustrated in FIG. 11, on the right and left side portions of the vehicle 42, as display units, projectors 27 are provided on the front and rear sides of a pair of front-rear projectors 26. Further, as an alerting unit, an alerting device 29 (see FIG. 12) is provided in the vehicle 42.

In addition, as a work device, an automatic unloading device 50 is provided in the vehicle 42. The automatic unloading device 50 is configured to be automatically controlled by a predetermined program. The automatic unloading device 50 is configured to be capable of executing the unloading work in the vicinity of the vehicle 42, and has a configuration substantially the same as that of the automatic unloading device 30 (see FIG. 2) of the first embodiment except for features to be described below. Work modes of the automatic unloading device 50 include a normal mode, a first emergency mode, and a second emergency mode. The normal mode is the same as that of the first embodiment, and the first emergency mode is the same as the emergency mode of the first embodiment. The second emergency mode is set such that the automatic unloading device 50 executes the unloading work more safely than in the normal mode during a predefined emergency, and is a mode in which the automatic unloading device 50 executes the unloading work with a work limit smaller than that in the first emergency mode. Here, the second emergency mode includes the execution of the unloading work by the automatic unloading device 50 at a work speed lower than that in the normal mode (for example, half of the work speed in the normal mode). In other words, in the present embodiment, for example, the work limit in the second emergency mode is smaller than that in the first emergency mode in terms of work speed.

Figure 12:
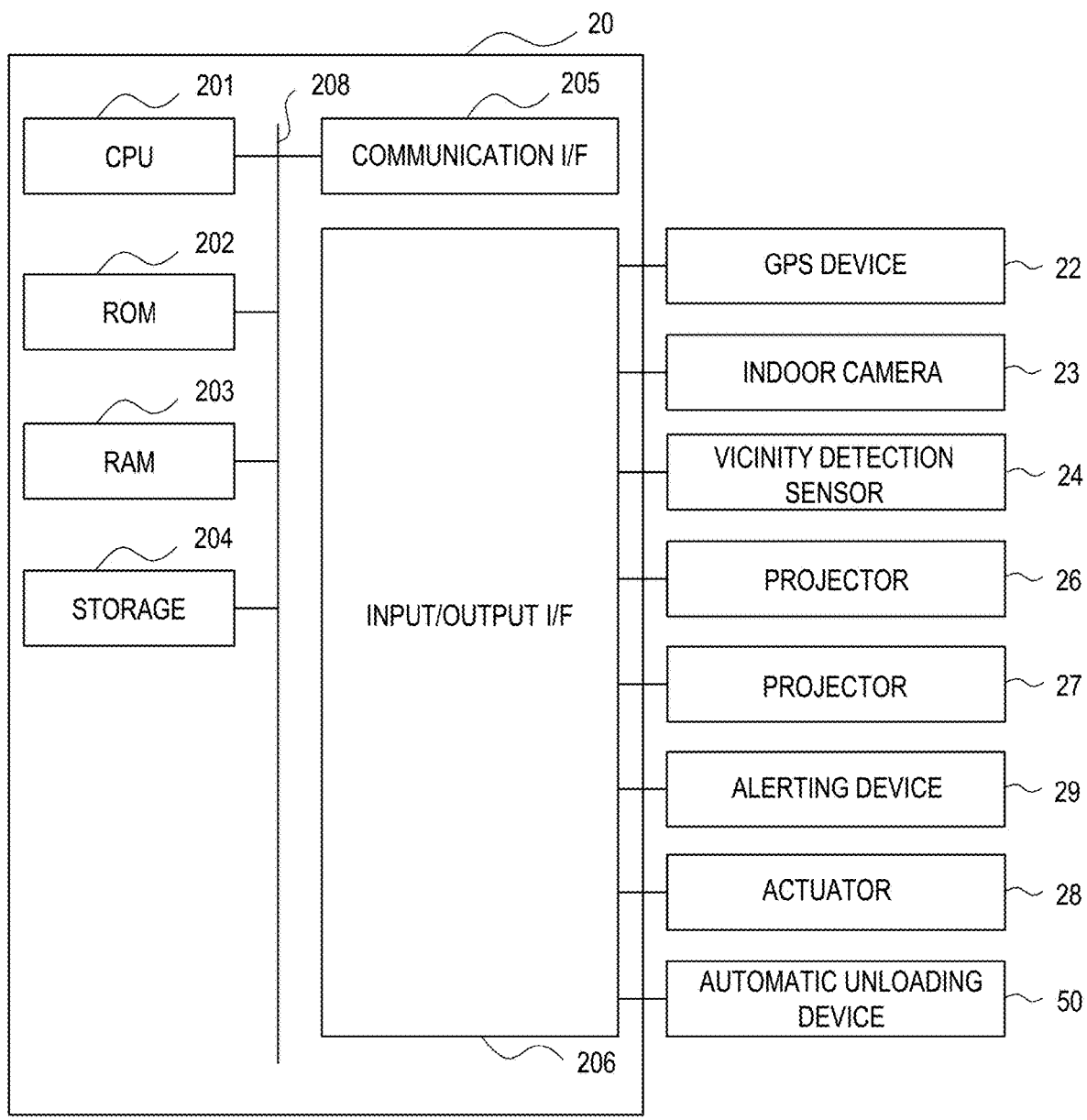
FIG. 12 is a block diagram illustrating an example of a hardware configuration of the work system of FIG. 11.

FIG. 12 is a block diagram illustrating an example of a hardware configuration of the work system 40. The hardware configuration of an ECU 20 of the work system 40 is the same as that of the ECU 20 (see FIG. 3) of the work system 10 according to the first embodiment, and thus, for convenience, is denoted by the same reference signs as that of the ECU 20 of the first embodiment.

For example, the GPS device 22, the indoor camera 23, the vicinity detection sensors 24, the projectors 26, the projectors 27, the alerting device 29, the actuator 28, and the automatic unloading device 50 are connected to the ECU 20 of the present embodiment via the input/output I/F 206. The projectors 26 visibly display a range of a first monitoring region A1 (see FIG. 11) in a plan view, and the projectors 27 visibly display a range of a second monitoring region A2 (see FIG. 11) in a plan view. The alerting device 29 alerts the surroundings of the vehicle 42 using, for example, at least one of sound and light.

Moreover, the ROM 202 or the storage 204 of the ECU 20 of the present embodiment stores a region setting program for setting the first monitoring region A1 and the second monitoring region A2 (both see FIG. 11), a work program different from that described in the first and the second embodiments, and the like.

Figure 13:
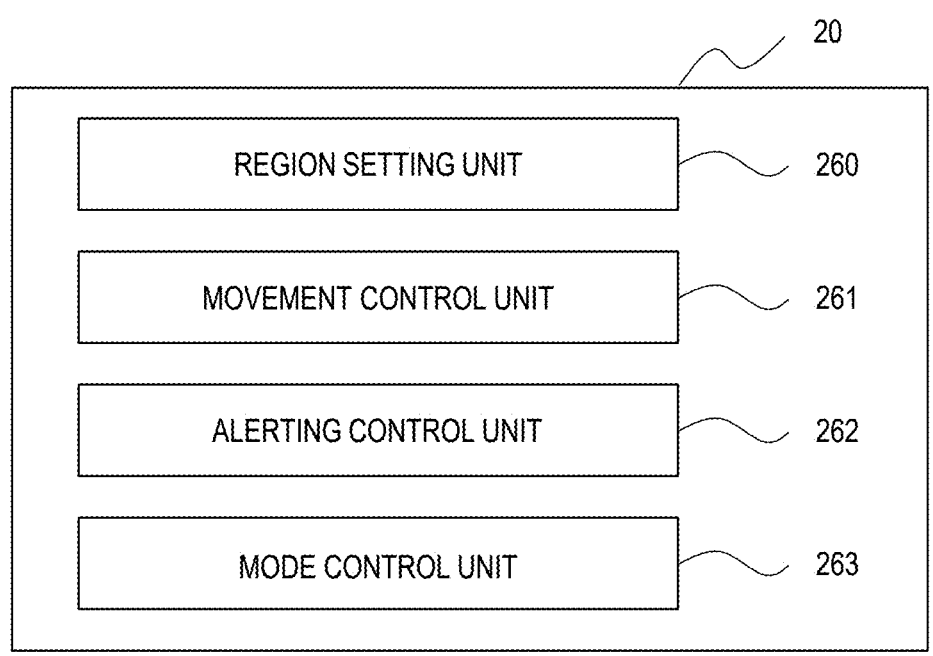
FIG. 13 is a block diagram illustrating an example of a functional configuration of an ECU in the work system of FIG. 11.

FIG. 13 is a block diagram illustrating an example of a functional configuration of the ECU 20. As illustrated in FIG. 13, the ECU 20 includes a region setting unit 260, a movement control unit 261, an alerting control unit 262, and a mode control unit 263, as functional components. The CPU 201 reads out and executes the programs (the above-described region setting program and work program of the present embodiment) stored in the ROM 202 or the storage 204, whereby a function of each component is realized.

The region setting unit 260 sets the first monitoring region A1 (see FIG. 11) including at least a part of a movable region of the automatic unloading device 50 outside the vehicle 42, and the second monitoring region A2 (see FIG. 11) which includes the entire first monitoring region A1 and is wider than the first monitoring region A1. The range of the first monitoring region A1 of the present embodiment is set to be the same as that of the monitoring region A (see FIG. 2) of the first embodiment.

The movement control unit 261 is a functional unit substantially the same as the movement control unit 251 (see FIG. 9) of the second embodiment. When it is determined that an obstacle has entered the first monitoring region A1 or it is predicted that an obstacle will enter the first monitoring region A1 based on the detection result of each of the vicinity detection sensors 24 and when the automatic unloading device 50 has stopped the unloading work, the movement control unit 261 executes control for moving the vehicle 42 such that the first monitoring region A1 is positioned in an area which an obstacle has neither entered nor is predicted to enter.

When it is determined that an obstacle has entered the second monitoring region A2 or it is predicted that an obstacle will enter the second monitoring region A2 based on the detection result of each of the vicinity detection sensors 24, the alerting control unit 262 controls the alerting device 29 such that the alerting device 29 alerts the surroundings of the vehicle 42.

Based on the detection result of each of the vicinity detection sensors 24, when it is determined that an obstacle has not entered the first monitoring region A1 and it is not predicted that an obstacle will enter the first monitoring region A1, and it is determined that an obstacle has entered the second monitoring region A2 or it is predicted that an obstacle will enter the second monitoring region A2 and when the work mode is not the second emergency mode, the mode control unit 263 controls the automatic unloading device 50 such that the automatic unloading device 50 switches the work mode to the second emergency mode.

Further, when it is determined that an obstacle has entered the first monitoring region A1 or it is predicted that an obstacle will enter the first monitoring region A1 based on the detection result of each of the vicinity detection sensors 24 and when the work mode is not the first emergency mode, the mode control unit 263 controls the automatic unloading device 50 such that the automatic unloading device 50 switches the work mode to the first emergency mode.

Next, an action of the work system 40 will be described.

FIG. 14 is a flowchart illustrating an example of a flow of a work control process by the ECU 20. The CPU 201 reads out the work program from the ROM 202 or the storage 204, and develops and executes it in the RAM 203, whereby the work control process is executed by the ECU 20. When the vehicle 42 has stopped at a planned unloading work spot and the region setting unit 260 has set the first monitoring region A1 and the second monitoring region A2 (both see FIG. 11) outside the vehicle 42, the execution of the work control process illustrated in FIG. 14 is started. The first monitoring region A1 and the second monitoring region A2 are set by the execution of the region setting program.

First, the CPU 201 determines whether an obstacle has entered the first monitoring region A1 or is predicted to enter the first monitoring region A1 based on the detection result of each of the vicinity detection sensors 24 (step S120).

Upon determining that an obstacle has entered the first monitoring region A1 or is predicted to enter the first monitoring region A1 (step S120: Y), the CPU 201 proceeds to a process of step S134. Processes after step S134 are substantially the same as those after step S103A in FIG. 10 of the second embodiment, but will be described below. On the other hand, upon determining that an obstacle has neither entered the first monitoring region A1 nor is predicted to enter the first monitoring region A1 (step S120: N), the CPU 201 proceeds to a process of step S122.

In step S122, the CPU 201 determines whether an obstacle has entered the second monitoring region A2 or is predicted to enter the second monitoring region A2 based on the detection result of each of the vicinity detection sensors 24.

Upon determining that an obstacle has neither entered the second monitoring region A2 nor is predicted to enter the second monitoring region A2 (step S122: N), the CPU 201 controls the automatic unloading device 50 such that the automatic unloading device 50 executes the normal mode (step S124) and proceeds to a process of step S144 to be described below. On the other hand, upon determining that an obstacle has entered the second monitoring region A2 or is predicted to enter the second monitoring region A2 (step S122: Y), the CPU 201 proceeds to a process of step S126.

In step S126, the CPU 201 controls the alerting device 29 such that the alerting device 29 alerts the surroundings of the vehicle 42. Therefore, it is possible to alert the surroundings of the vehicle 42. Moreover, in the next step S128, the CPU 201 determines whether the work mode is the second emergency mode. Upon determining that the work mode is the second emergency mode (step S128: Y), the CPU 201 controls the automatic unloading device 50 such that the automatic unloading device 50 executes the second emergency mode (step S130) and proceeds to the process of step S144 to be described below. On the other hand, upon determining that the work mode is not the second emergency mode (step S128: N), the CPU 201 controls, as the mode control unit 263, the automatic unloading device 50 such that the automatic unloading device 50 switches the work mode to the second emergency mode and executes the second emergency mode (step S132), and the CPU 201 proceeds to the process of step S144 to be described below.

Here, since the second emergency mode includes the execution of the unloading work by the automatic unloading device 50 at a work speed lower than that in the normal mode, it is possible to prevent or effectively restrict an obstacle from disrupting the automatic unloading device 50 while the automatic unloading device 50 is executing the unloading work without stopping. In addition, it is possible to avoid a sudden change in the work speed of the unloading work and improve the durability of the automatic unloading device 50.

Meanwhile, in step S134, the CPU 201 determines whether the automatic unloading device 50 has stopped the unloading work. Upon determining that the automatic unloading device 50 has not stopped the unloading work (step S134: N), the CPU 201 proceeds to a process of step S138. On the other hand, upon determining that the automatic unloading device 50 has stopped the unloading work (step S134: Y), the CPU 201 executes, as the movement control unit 261, control for moving the vehicle 42 such that the monitoring region A is positioned in an area which the obstacle has neither entered nor is predicted to enter (step S136). Therefore, an obstacle is prevented or effectively restricted from disrupting the work of the automatic unloading device 50. After the execution of step S136, the CPU 201 ends the process based on the work program.

When the vehicle 42 has moved and stopped at a new planned unloading work spot in the process of step S136, the first monitoring region A1 including at least the part of the movable region of the automatic unloading device 50 outside the vehicle 42 and the second monitoring region A2 (both see FIG. 11) are set again, and the execution of the control process illustrated in FIG. 14 is restarted.

Meanwhile, in step S138, the CPU 201 determines whether the work mode is the first emergency mode. Upon determining that the work mode is the first emergency mode (step S138: Y), the CPU 201 controls the automatic unloading device 50 such that the automatic unloading device 50 executes the first emergency mode (step S140), and the CPU 201 proceeds to the process of step S144 to be described below. On the other hand, upon determining that the work mode is not the first emergency mode (step S138: N), the CPU 201 controls, as the mode control unit 263, the automatic unloading device 50 such that the automatic unloading device 50 switches the work mode to the first emergency mode and executes the first emergency mode (step S142), and the CPU 201 proceeds to the process of step S144 to be described below.

In step S144, the CPU 201 determines whether the automatic unloading device 50 has completed the unloading work. Upon determining that the automatic unloading device 50 has not completed the unloading work (step S144: N), the CPU 201 repeats the processes from step S120. On the other hand, upon determining that the automatic unloading device 50 has completed the unloading work (step S144: Y), the CPU 201 ends the process based on the work program.

As such, by controlling the automatic unloading device 50 in the multi-step work modes, an obstacle is prevented or effectively restricted from disrupting the work of the automatic unloading device 50 while a decrease in efficiency of the unloading work is curbed. In addition, in the present embodiment, since the automatic unloading device 50 is configured to be automatically controlled by a predetermined program, the automatic unloading device 50 does not require an operation instruction from an operator and an obstacle is prevented or effectively restricted from disrupting the work of the automatic unloading device 50.

Moreover, in the present embodiment, the range of the first monitoring region A1 in a plan view illustrated in FIG. 11 is visibly displayed by a projection line (not shown) projected onto the road surface by the projectors 26. Further, the range of the second monitoring region A2 in a plan view is visibly displayed by a projection line (not shown) projected onto the road surface by the projectors 27. Therefore, a pedestrian or the like can easily recognize the respective ranges of the first monitoring region A1 and the second monitoring region A2 in a plan view. Accordingly, by avoiding, in advance, a state where an obstacle has entered the first monitoring region A1 or a state where an obstacle is likely to enter the first monitoring region A1, it is possible to prevent a decrease in efficiency of the unloading work while ensuring safety. Moreover, by avoiding, in advance, a state where an obstacle has entered the second monitoring region A2 or a state where an obstacle is likely to enter the second monitoring region A2, it is possible to further prevent a decrease in efficiency of the unloading work while ensuring safety.

As described above, according to the present embodiment, it is possible to prevent or effectively restrict an obstacle from disrupting the work of the automatic unloading device 50 when the obstacle approaches the vicinity of the vehicle 42.

In a modified example of the third embodiment, steps S134 and S136 of FIG. 14 may be omitted. In this case, when a situation where an obstacle has entered the first monitoring region A1, or the like, has occurred and the work mode is not the first emergency mode, the CPU 201 immediately switches, as the mode control unit 263, the work mode to the first emergency mode. Further, in another modified example, instead of step S136 and ending the process after the execution of step S136 in FIG. 14, when the CPU 201 has determined in step S134 that the automatic unloading device 30 has stopped the unloading work, the CPU 201 may return to the process of step S120. Moreover, step S126 in FIG. 14 may be omitted.

Supplementary Description of Embodiments

In a modified example of the first to third embodiments, the display unit may visibly display a three-dimensional range including the range of the monitoring region (the monitoring region A in the first and second embodiments, and the first monitoring region A1 in the third embodiment) in a plan view. Further, in a modified example of the third embodiment, the display unit may visibly display a three-dimensional range including the range of the second monitoring region A2 in a plan view.

In addition, in another modified example of the first to third embodiments, a part of the boundary of the monitoring region (the monitoring region A in the first and second embodiments, and the first monitoring region A1 in the third embodiment) may be visualized using a physical tool, such as a crossing bar, so that the part can be recognized by a person. The modification also contributes to avoiding the approaching of an obstacle to the monitoring region. Similarly, in a modified example of the third embodiment, a part of the boundary of the second monitoring region A2 may be visualized using a physical tool, such as a crossing bar, so that the part can be recognized by a person.

Moreover, whether an obstacle has entered the monitoring region (the monitoring region A in the first and second embodiments, and the first monitoring region A1 in the third embodiment) and whether an obstacle has entered the second monitoring region A2 may be determined by setting reference lines and determining whether the lines are crossed.

In addition, when it is determined that an obstacle has entered the monitoring region (the monitoring region A in the first and second embodiments, and the first monitoring region A1 in the third embodiment) or it is predicted that an obstacle will enter the monitoring region based on the detection result of the detection unit (each of the vicinity detection sensors 24), the CPU 201 may control the alerting unit (the alerting device 29) such that the alerting unit alerts the surroundings of the vehicles 12, 42.

Further, in the third embodiment, the second emergency mode is a mode in which the work is executed with a work limit smaller than that in the first emergency mode in terms of work speed. However, in a modified example, the second emergency mode may be a mode in which the work is executed with a work limit smaller than that in the first emergency mode in terms of, for example, a work range.

Moreover, in a modified example of the above embodiments, the monitoring region (the monitoring region A in the first and second embodiments, and the first monitoring region A1 in the third embodiment) and the second monitoring region A2 may be set in advance in relative positions with respect to the vehicles 12, 42 such that the monitoring region and the second monitoring region include the entire movable region of the work device. In such a modified example, since it is not necessary to set the first monitoring region (the monitoring region) and the second monitoring region each time the unloading work is executed, the overall unloading work speed is improved.

Further, in another modified example of the above embodiments, the moving trolley 32 of the automatic unloading devices 30, 50 may be configured to be taken out of the vehicle. Moreover, in the above embodiments, the work devices are the automatic unloading devices 30, 50. However, the work devices may be mounted on the vehicles 12, 42 and configured to be capable of executing work other than the unloading work in the vicinity of the vehicles 12, 42.

In addition, in yet another modified example of the above embodiments, the work device does not have to be automatically controlled, but may be a work device (for example, a device including a manipulator) configured such that a part of the operation is controlled by, for example, an operation of an operator in a normal mode. Further, in another modified example, the work device may be configured to start the unloading work when an operator presses an operation starting switch.

Moreover, in the above embodiments, a part of the control executed by the ECU 20 may be implemented by the control devices of the automatic unloading devices 30, 50.

In each of the above embodiments, the various processes, executed by the CPU 201 illustrated in FIGS. 3 and 12 by reading and executing the software (program), may also be executed by various processors other than the CPU. In this case, examples of the various processors include a programmable logic device (PLD) in which a circuit configuration can be changed after manufacturing a field-programmable gate array (FPGA) or the like, and a dedicated electric circuit, such as an application-specific integrated circuit (ASIC), which is a processor having a circuit configuration specifically designed for executing specific processing. In addition, each process may be executed by one of these various processors, or a combination of two or more processors of the same type or different types (for example, a plurality of FPGAs, and a combination of a CPU and an FPGA). A hardware composition of these various processors is, more specifically, an electric circuit in which circuit elements, such as semiconductor elements, are combined.

Further, each program described in the above embodiments may be provided in a form in which the program is recorded on a recording medium, such as a compact disc read-only memory (CD-ROM), a digital versatile disc read-only memory (DVD-ROM), and a universal serial bus (USB) memory. The program may be downloaded from an external device via a network.

The above embodiments and modified examples can be appropriately combined and implemented.

An example of the present disclosure has been described above. However, an applicable embodiment of the present disclosure is not limited to the above, and various modifications can be made without departing from the scope thereof.

What is claimed is:

1. A work system, comprising:
a work device mounted on a vehicle and configured to execute work in a vicinity of the vehicle, the work device being configured to operate while switching between a plurality of work modes including
a normal mode which is a normal work mode, and
a first emergency mode which is set such that the work device executes the work more safely than in the normal mode during a predefined emergency;
a detection device configured to detect information on the vicinity of the vehicle; and
a processor configured to set a first monitoring region including at least a part of a movable region of the work device outside the vehicle, wherein
the processor is configured to,
(i) when it is determined that an obstacle has entered the first monitoring region or it is predicted that an obstacle will enter the first monitoring region based on a detection result of the detection device, and (ii) when the work mode is not the first emergency mode,
control the work device such that the work device switches the work mode to the first emergency mode, and
(iii) when it is determined that an obstacle has entered the first monitoring region or it is predicted that an obstacle will enter the first monitoring region based on the detection result of the detection device, and (iv) when the work device has stopped the work,
execute control for moving the vehicle such that the first monitoring region is positioned in an area which an obstacle has neither entered nor is predicted to enter.

2. The work system according to claim 1, wherein the first emergency mode includes stopping of the work by the work device.

3. A work system, comprising:
a work device mounted on a vehicle and configured to execute work in a vicinity of the vehicle, the work device being configured to operate while switching between a plurality of work modes including
a normal mode which is a normal work mode, and
a first emergency mode which is set such that the work device executes the work more safely than in the normal mode during a predefined emergency;
a detection device configured to detect information on the vicinity of the vehicle; and
a processor configured to set a first monitoring region including at least a part of a movable region of the work device outside the vehicle, wherein:
the plurality of work modes includes a second emergency mode which is set such that (a) the work device executes the work more safely than in the normal mode during the predefined emergency, and (b) the work device executes the work with a work limit smaller than the work limit in the first emergency mode;
the processor is configured to set a second monitoring region which includes the entire first monitoring region and is wider than the first monitoring region; and
the processor is configured to, (i) when it is determined that an obstacle has entered the first monitoring region or it is predicted that an obstacle will enter the first monitoring region based on a detection result of the detection device, and (ii) when the work mode is not the first emergency mode,
   control the work device such that the work device switches the work mode to the first emergency mode, and
(iii) when it is determined that an obstacle has not entered the first monitoring region and it is not predicted that an obstacle will enter the first monitoring region, and it is determined that an obstacle has entered the second monitoring region or it is predicted that an obstacle will enter the second monitoring region based on the detection result of the detection device and (iv) when the work mode is not the second emergency mode,
   control the work device such that the work device switches the work mode to the second emergency mode.

4. The work system according to claim 3, wherein the second emergency mode includes the execution of the work by the work device at a work speed lower than the work speed in the normal mode.

5. The work system according to claim 3, further comprising:
   an alerting device configured to alert surroundings of the vehicle, wherein
   the processor is configured to, when it is determined that an obstacle has entered the second monitoring region or it is predicted that an obstacle will enter the second monitoring region based on the detection result of the detection device, control the alerting device such that the alerting device alerts the surroundings of the vehicle.

6. The work system according to claim 1, further comprising a display device configured to visibly display at least a range of the first monitoring region in a plan view.

7. The work system according to claim 3, further comprising a display device configured to visibly display at least a range of the second monitoring region in a plan view.

8. The work system according to claim 1, wherein the work device is configured to be automatically controlled by a predetermined program.

* * * * *